United States Patent
Wan et al.

(10) Patent No.: US 12,545,596 B2
(45) Date of Patent: Feb. 10, 2026

(54) LITHIUM-RICH IRON-BASED COMPOSITE MATERIAL AND PREPARATION METHOD AND APPLICATION THEREOF

(71) Applicant: SHENZHEN DYNANONIC INNOVAZONE NEW ENERGY TECHNOLOGY CO., LTD., Guangdong (CN)

(72) Inventors: Yuanxin Wan, Guangdong (CN); Zeqin Zhong, Guangdong (CN); Lingyong Kong, Guangdong (CN); Zhongke Zhao, Guangdong (CN); Xianyinan Pei, Guangdong (CN)

(73) Assignee: SHENZHEN DYNANONIC INNOVAZONE NEW ENERGY TECHNOLOGY CO., LTD., Guangdong (CN)

( * ) Notice: Subject to any disclaimer, the term of this patent is extended or adjusted under 35 U.S.C. 154(b) by 170 days.

(21) Appl. No.: 18/001,662

(22) PCT Filed: May 9, 2022

(86) PCT No.: PCT/CN2022/091650
§ 371 (c)(1),
(2) Date: Dec. 13, 2022

(87) PCT Pub. No.: WO2022/237715
PCT Pub. Date: Nov. 17, 2022

(65) Prior Publication Data
US 2024/0228318 A1    Jul. 11, 2024

(30) Foreign Application Priority Data
May 12, 2021    (CN) .......... 202110517676.8

(51) Int. Cl.
*C01G 49/00*    (2006.01)
*H01M 4/02*    (2006.01)
(Continued)

(52) U.S. Cl.
CPC .......... *C01G 49/0027* (2013.01); *H01M 4/62* (2013.01); *H01M 10/0525* (2013.01);
(Continued)

(58) Field of Classification Search
CPC   C01G 49/0027; H01M 4/62; H01M 10/0525; H01M 10/446; H01M 2004/028;
(Continued)

(56) References Cited

U.S. PATENT DOCUMENTS

| | | | |
|---|---|---|---|
| 2018/0212231 A1 | 7/2018 | Kepler et al. | |
| 2023/0121840 A1 | 4/2023 | Cheng et al. | |

FOREIGN PATENT DOCUMENTS

| | | | |
|---|---|---|---|
| CN | 105702961 A | * | 6/2016 |
| CN | 110518297 A | | 11/2019 |

(Continued)

OTHER PUBLICATIONS

Bardestani, Raoof et al. Experimental Methods in Chemical Engineering: Specific Surface Area and Pore Size Distribution Measurements—BET, BJH, and DFT. The Canadian Journal of Chemical Engineering. Aug. 12, 2019. 11 pages.
(Continued)

*Primary Examiner* — Daniel S Gatewood
(74) *Attorney, Agent, or Firm* — Brooks Kushman P.C.

(57) ABSTRACT

The present application discloses a lithium-rich iron-based composite material and a preparation method and application thereof. The lithium-rich iron-based composite material includes a lithium-rich iron-based material having a molecular formula of $aLiFeO_2 \cdot bLi_2O \cdot cM_xO_y$, where a, b, and c are numbers of moles, and $0 \le c/(a+b+c) \le 0.02$, $1.8 \le b/a \le 2.1$, M is
(Continued)

a doping element, and 1≤y/x≤2.5. The lithium-rich iron-based composite material can provide abundant lithium, and the lithium-rich iron-based material has a high purity and low residual alkali on the surface, which lead to high capacity and good lithium supplementing effect, as well as good stability for storage and processing. The application of the lithium-rich iron-based composite material in a lithium-supplementing additive for cathodes, a cathode material, a cathode and a lithium-ion battery.

19 Claims, 4 Drawing Sheets

(51) Int. Cl.
*H01M 4/62* (2006.01)
*H01M 10/0525* (2010.01)
*H01M 10/44* (2006.01)

(52) U.S. Cl.
CPC ....... *H01M 10/446* (2013.01); *C01P 2002/72* (2013.01); *C01P 2002/82* (2013.01); *C01P 2004/03* (2013.01); *C01P 2004/51* (2013.01); *C01P 2004/61* (2013.01); *C01P 2004/86* (2013.01); *C01P 2006/12* (2013.01); *C01P 2006/40* (2013.01); *H01M 2004/028* (2013.01)

(58) Field of Classification Search
CPC .... H01M 10/058; H01M 4/131; H01M 4/136; C01P 2002/72; C01P 2002/82; C01P 2004/03; C01P 2004/51; C01P 2004/61; C01P 2004/86; C01P 2006/12; C01P 2006/40; Y02E 60/10
See application file for complete search history.

(56) References Cited

FOREIGN PATENT DOCUMENTS

| CN | 111725576 A | | 9/2020 | |
|----|----|----|----|----|
| CN | 112186143 A | * | 1/2021 | ............ H01M 4/131 |
| CN | 110518298 B | | 3/2021 | |
| CN | 112490415 A | | 3/2021 | |
| CN | 113782706 A | * | 12/2021 | .............. H01M 4/13 |
| CN | 114050258 A | | 2/2022 | |
| CN | 114497694 A | | 5/2022 | |
| IN | 111834618 A | | 10/2020 | |
| JP | 2019085316 A | * | 6/2019 | |
| KR | 20060008568 A | | 1/2006 | |

OTHER PUBLICATIONS

Ndama, Adoum Traore et al. Measurement of Electrical Resistivity of Powder; Comparison of Three Methods. International Journal of Engineering Trends and Technology. vol. 69 Issue 8, 41-48, Aug. 2021. 8 pages.

Ding, Keqiang et al. Preparation of Li5Fe1-xMnx04/CNT Materials for Li-Ion Batteries. International Journal of Electrochemical Science. Dec. 1, 2011, 12 pages.

National Intellectual Property Administration, PRC, Office Action for Chinese Patent Application No. 202110517676.8 dated Oct. 19, 2024. 10 pages.

European Search Report for European Application No. EP 22806680. 9, Completed by the European Patent Office, Dated Sep. 24, 2024, 11 pages.

* cited by examiner

LITHIUM-RICH IRON-BASED COMPOSITE MATERIAL AND PREPARATION METHOD AND APPLICATION THEREOF

CROSS-REFERENCE TO RELATED APPLICATIONS

This application is a U.S. national phase of International Patent Application No. PCT/CN2022/091650 with an international filing date of May 9, 2022, designating the U.S., now pending, and further claims the benefit of Chinese patent application No. 202110517676.8, titled "Lithium-rich iron-based composite material and preparation method and application thereof" filed on May 12, 2021, the contents of which are incorporated herein by reference.

TECHNICAL FIELD

The present application relates to the field of lithium-ion batteries, and in particular, to a lithium-rich iron-based composite material and a preparation method and application thereof.

BACKGROUND

The oil energy crisis in the 1960s and 1970s forced people to look for new alternative energy sources. Lithium-ion batteries are considered to be one of the most promising energy sources due to their high operating voltage and energy density, relatively small self-discharge level, no memory effect, no pollution from heavy metal elements such as lead and cadmium, and long cycle life.

During the first-time charging process of a lithium-ion battery, the surface of the anode is usually accompanied by the formation of a solid electrolyte film SEI. This process consumes a large amount of $Li^+$, causing the $Li^+$ released from the cathode material to be irreversibly consumed, thereby reducing the reversible specific capacity of the cell. Anode materials, especially silicon-based anode materials, will further consume $Li^+$, resulting in a very low initial coulombic efficiency.

In order to improve the low coulombic efficiency problem caused by the irreversible loss of the anode, in addition to the pre-lithiation of the anode material and the electrode sheet, supplementing the cathode with lithium can also achieve high energy density. The lithium-rich iron-based materials have theoretical capacity as high as 867 mAh/g, with an operating-voltage window consistent with that of conventional lithium-ion batteries, and they basically do not participate in the electrochemical process in the later stage. Therefore, they are lithium-supplementing additives with broad prospects.

At present, there have been reports on the cathode lithium supplement materials. For example, in a known lithium-supplementing material for cathodes, the lithium-supplementing material $Li_5FeO_4$ for the cathode of lithium-ion batteries is prepared by the sol-gel method. This material as a lithium-supplementing material for the cathode of lithium-ion batteries has large capacity and small discharge capacity, however, the material has poor adaptability to the environment, and the surface layer thereof has a large residual alkali and therefore is difficult to manufacture.

In another lithium-supplementing material for cathodes, a lithium-supplementing material containing Co-doped or Co-doped lithium ferrate and carbon materials and a sol-gel preparation method have been disclosed. However, during the in-situ coating process of carbon source at high temperature in the conventional sol-gel process, the sol-gel is easy to react with lithium source to form electrochemically inactive lithium carbonate, which affects the proportion of active bodies.

In another known lithium-supplementing material for cathodes, a carbon-coated lithium ferrite material and its preparation method are disclosed. A carbon source is used for gas-phase coating to isolate the external environment, avoiding lithium ferrite from being in contact with water or carbon dioxide in the air, thus improves the material stability, however, the control of the $Li_2O$ composition of the material has not been described.

Studying the relevant published lithium-supplementing materials for cathodes, it is found that although the lithium-supplementing materials for cathodes currently available can play a role in lithium supplementation, there are still deficiencies in the existing lithium-supplementing materials for cathodes, amongst which the low purity and a large amount of surface residual alkali are notable. The interface of the material lacks the protection of a passivation layer, and it is prone to react with moisture in the environment to form $Li_2O$ again. It is because of the low purity and the instability of the interface that the large amount of residual alkali remaining on the surface causes the undesirable stability of storage and processing of existing lithium-supplementing materials for cathodes, hence the effect of lithium supplementation is not ideal, and it is difficult for large-scale production, an improved capacity is also needed.

SUMMARY

The present application provides a lithium-rich iron-based composite material and a preparation method and application thereof, to overcome at least the problems of the existing lithium-supplementing additives for cathodes, such as poor processability and low capacity, caused by the low purity and the large amount of residual alkali on the surface.

An aspect of the present application provides a lithium-rich iron-based composite material, which includes a lithium-rich iron-based materials with the molecular formula of $aLiFeO_2 \cdot bLi_2O \cdot cM_xO_y$, where a, b, and c are numbers of moles, and $0 \le c/(a+b+c) \le 0.02$, $1.8 \le b/a \le 2.1$, M is a doping element, and $1 \le y/x \le 2.5$.

Further, the doping element includes at least one of Ni, Co, Mn, Ti, Al, Cu, V, and Zr.

Further, the lithium-rich iron-based material is in the form of particles with a particle size of 1 μm≤D50≤10 μm, D10/D50≥0.3, D90/D50≤2.

Further, the lithium-rich iron-based material is in the form of particles, having a surface coated with a carbon coating layer.

Still further, a thickness of the carbon coating layer is 1-200 nm.

Still further, the carbon coating accounts for 1 wt %-5 wt % of a total mass of the lithium-rich iron-based composite material.

Further, the lithium-rich iron-based composite material is in the form of particles, with a particle size of 1 μm≤D50≤15 μm, D10/D50≥0.3, D90/D50≤2.

Further, a specific surface area of the lithium-rich iron-based composite material is $0.5 \le BET \le 20$ $m^2/g$.

Further, a resistivity of the lithium-rich iron-based composite material is 1.0-1000 Ω/cm.

Further, peaks in ranges of $2\Theta=16.7\pm0.5°$ and $33.7\pm0.5°$ in the X-ray diffraction spectrum of the lithium-rich iron-based composite materials originate from crystal planes (111) and (222) of $LiFeO_2 \cdot 2Li_2O$, and intensities of the peaks within the ranges of 2Θ=16.7±0.5° and 33.7±0.5° are respectively recorded as $I_a$ and $I_b$; where $I_a/I_b \geq 0.26$.

Still further, a peak in a range of 2Θ=43.5±0.5° corresponds to a crystal plane (220) of LiFeO$_2$, and an intensity of the peak is recorded as $I_c$, where $I_a/I_c \geq 0.5$.

Further, in the Raman spectrum of the lithium-rich iron-based composite material, intensities of scattering peaks at wavelengths of 1330 cm$^{-1}$ and 1580 cm$^{-1}$ are respectively recorded as $I_D$ and $I_G$, where $I_D/I_G < 4.0$.

Still further, $I_D/I_G < 3.0$.

Another aspect of the present application provides a preparation method of a lithium-rich iron-based composite material, which includes the following steps:

mixing, according to a stoichiometric ratio of elements in a molecular formula of aLiFeO$_2$·bLi$_2$O·cM$_x$O$_y$, an iron source, a lithium source, and a doping element source to form a precursor; and carrying out a first sintering treatment of the precursor to generate a lithium-rich iron-based material with the molecular formula of aLiFeO$_2$·bLi$_2$O·cM$_x$O$_y$;

where a, b, and c are the numbers of moles, and 0≤c/(a+b+c)≤0.02, 1.8≤b/a≤2.1, M is a doping element, and 1≤y/x≤2.5.

Further, the iron source includes at least one of iron oxide, iron nitrate, iron chloride, iron hydroxide, iron oxalate, and iron acetate; and/or further, the lithium source includes at least one of lithium hydroxide, lithium carbonate, lithium nitrate, lithium acetate, lithium oxide, and lithium oxalate; and/or further, the doping element source includes at least one of Cu, Co, Al, Ti, Fe, V, and Zr sources.

Specifically, the Cu source may be at least one of copper oxide, copper nitrate, copper chloride, copper hydroxide, copper acetate, and copper carbonate.

Specifically, the Co source may be at least one of cobalt oxide, cobalt nitrate, cobalt chloride, cobalt hydroxide, cobalt acetate, and cobalt carbonate.

Specifically, the Al source may be at least one of aluminum oxide, aluminum nitrate, aluminum chloride, aluminum hydroxide, and aluminum acetate.

Specifically, the Ti source may be at least one of titanium dioxide and titanium chloride.

Specifically, the Ni source may be at least one of nickel oxide, nickel nitrate, nickel chloride, nickel hydroxide, and nickel acetate.

Specifically, the V source may be at least one of vanadium pentoxide and vanadyl nitrate.

Specifically, the Zr source may be at least one of zirconium oxide, zirconium nitrate, zirconium chloride, zirconium hydroxide, zirconium acetate, and zirconium carbonate.

Further, in the step of mixing the iron source, the lithium source, and the doping element source, a carbon source is also added; the carbon source and the total mass of the reactant is 5 wt %-50 wt %;

Further, a first sintering temperature is at 600-1000° C., and a duration thereof is 4-48 h; and/or Further, a heating rate of the first sintering treatment is 10-500° C./h, until the first sintering temperature; and/or Further, the first sintering treatment is followed by a second sintering treatment, which includes:

crushing a product after the first sintering treatment and heating at 0-500° C./h to 600-1000° C. for a heat treatment of 1-20 h.

Still further, after the first sintering treatment or the second sintering treatment, further including a step of forming a carbon coating layer on the surface of the lithium-rich iron-based material.

Yet another aspect of the present application provides a lithium-supplementing additive for cathodes. The lithium-supplementing additive for cathodes of the present application includes the lithium-rich iron-based composite material of the present application or a lithium-rich iron-based composite material prepared by the preparation method of a lithium-rich iron-based composite material of the present application.

Still another aspect of the present application provides a cathode material. The cathode material of the present application includes the lithium-rich iron-based composite material of the present application or a lithium-rich iron-based composite material prepared by the preparation method of a lithium-rich iron-based composite material of the present application or the lithium-supplementing additive for cathodes of the present application.

Still another aspect of the present application provides a cathode. The cathode of the present application includes a current collector and a cathode active layer bonded to a surface of the current collector, and the cathode active layer includes a cathode active material, a lithium-supplementing additive, a binder and a conductive agent; the lithium-supplementing additive is the lithium-rich iron-based composite material of the present application, or a lithium-rich iron-based composite material prepared by the preparation method of a lithium-rich iron-based composite material of the present application, or the lithium-supplementing additive for cathodes of the present application.

Further, a content of the lithium-supplementing additive in the cathode active layer is 0.5 wt %-10 wt %.

Further, a content of the conductive agent in the cathode active layer is 0.2 wt %-5 wt %.

Further, a content of the binder in the cathode active layer is 0.5 wt %-3 wt %.

Still another aspect of the present application provides a lithium-ion battery. The lithium-ion battery of the present application includes a cathode of the present application.

Further, the lithium-ion battery is a lithium-ion half cell, having an initial coulombic efficiency of 75%-99%.

The present application has the following advantageous effects compared to existing technologies.

The lithium-rich iron-based material contained in the lithium-rich iron-based composite material of this application is rich in lithium and can supply abundant lithium, so that it can be used as a "sacrificial agent" during the first cycle of charging to release all the lithium ions at once as much as possible. It is used to compensate the irreversible lithium ions consumed by the formation of the SEI film on the anode, so as to maintain the abundance of lithium ions in the battery system and improve the first-time charging efficiency and overall electrochemical performance of the battery. Moreover, the lithium-rich iron-based material has a high purity and low residual alkali on the surface, which enables the lithium-rich iron-based composite material with high capacity and good lithium supplementing effect, as well as good stability for storage and processing.

Further, coating the surface of the lithium-rich iron-based material with a carbon coating can effectively reduce the residual alkali content remaining on the surface of the lithium-rich iron-based material, thereby ensuring and enhancing the stability for storage and processing. At the same time, the conductivity of the lithium-rich iron-based material is effectively improved, enabling the lithium-rich iron-based composite material with high electrical conductivity, stimulating the gram capacity of the lithium-rich iron-based composite material, and realizing a true high-efficiency lithium supplementation.

The preparation method of a lithium-rich iron-based composite material of the present application prepares the lithium-rich iron-based material by directly mixing and sintering the corresponding source compounds according to the stoichiometric ratio of the elements in $aLiFeO_2 \cdot bLi_2O \cdot cM_xO_y$. Therefore, the lithium-rich iron-based material obtained is rich in lithium, and has s a high purity and low residual alkali on the surface, which enables the lithium-rich iron-based composite material with high capacity and good lithium supplementing effect, as well as good stability for storage and processing. In addition, the preparation method of a lithium-rich iron-based composite material can ensure that the prepared lithium-rich iron-based composite material has a stable structure and electrochemical performance, and has high efficiency and saves production costs.

The lithium-supplementing additive for cathodes in the present application has the lithium-rich iron-based composite material of the present application, thus the lithium-supplementing additive for cathodes and the cathode material can be used as a "sacrificial agent" during the first cycle of charging process to compensate the irreversible lithium ions consumed by the formation of the SEI film on the anode, so as to maintain the abundance of lithium ions in the battery system and improve the first-time charging efficiency and overall electrochemical performance of the battery.

The lithium-ion battery in the present application includes the lithium-rich iron-based composite material of the present application, therefore, it has a good cycling performance and low internal resistance, which enables the lithium-ion battery of the present application with excellent initial coulombic efficiency, battery capacity and cycle performance, long service life and stable electrochemical performance.

BRIEF DESCRIPTION OF THE DRAWINGS

In order to more clearly illustrate the technical proposals in embodiments of the present application, accompanying drawings that are used in the description of the embodiments or exemplary technologies are briefly introduced hereinbelow. Obviously, the drawings in the following description are merely some embodiments of the present application. For those skilled in the art, other drawings can also be obtained according to these drawings without any creative effort.

DETAILED DESCRIPTION OF THE EMBODIMENTS

Figure 1:
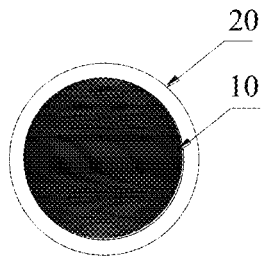
FIG. 1 is a schematic diagram of the lithium-rich iron-based composite material in an embodiment of the present application.

In order to make the purpose, technical proposals, and advantages of the present application more clearly understood, the present application will be described in further detail hereinbelow with reference to the accompanying drawings and embodiments. It should be understood that the specific embodiments described herein are merely used to explain the present application, but not to limit the present application.

In the present application, the term "and/or", which describes the relationship between related objects, means that there can be three relationships, for example, A and/or B, which can represent circumstances that A exists alone, A and B exist at the same time, and B exists alone, where A and B can be singular or plural. The character "/" generally indicates that the associated objects are an "or" relationship.

In this application, "at least one" means one or more, and "a plurality of" means two or more. "At least one item below" or similar expressions refer to any combination of these items, including any combination of single item or plural items. For example, "at least one of a, b, or c" can mean: a, b, c, a-b (i.e., a and b), a-c, b-c, or a-b-c, where a, b, and c can be singular or plural respectively.

It should be understood that, in various embodiments of the present application, the order of the sequential numbers of the above-mentioned processes does not imply the sequence of execution, some or all of the steps may be executed in parallel or sequentially, and the execution sequence of each process should be based on its functions and determined by the internal logic, and should not constitute any limitation on the implementation process of the embodiments of the present application.

The terms used in the embodiments of the present application are merely for the purpose of describing detailed embodiments, and are not intended to limit the present application. As used in the embodiments of this application and the appended claims, the singular forms "a," "said", and "the" are intended to include their plural forms as well, unless the context clearly dictates otherwise.

The weight of the relevant compositions mentioned in the examples of this application can not only refer to the specific content of each composition, but also represent the proportional relationship between the weights of the compositions. It is within the scope disclosed in the embodiments of the present application that the content of the compositions is proportionally scaled up or down. Specifically, the mass described in the description of the embodiments of the present application may be a mass unit known in the chemical field, such as μg, mg, g and kg.

The terms "first" and "second" are merely used for descriptive purposes to distinguish objects such as substances from each other, and cannot be understood as indicating or implying relative importance or implying the number of indicated technical features. For example, without departing from the scope of the embodiments of the present application, "the first" may also be referred to as "the second", and similarly, "the second" may also be referred to as "the first". Thus, a feature defined as "first" or "second" may expressly or implicitly include one or more of the features.

An aspect of the present application provides a lithium-rich iron-based composite material. The lithium-rich iron-based composite material in the embodiments of the present application includes a lithium-rich iron-based material, which has a molecular formula of $aLiFeO_2 \cdot bLi_2O \cdot cM_xO_y$, where a, b, and c are the numbers of moles, and $0 \leq c/(a+b+c) \leq 0.02$, $1.8 \leq b/a \leq 2.1$, M is a doping element, and $1 \leq y/x \leq 2.5$.

Since the lithium-rich iron-based composite material of this application includes the lithium-rich iron-based material with the above molecular formula, $aLiFeO_2 \cdot bLi_2O \cdot cM_xO_y$, hence it can supply abundant lithium, so that it can be used as a "sacrificial agent" during the first cycle of charging to release all the lithium ions at once as much as possible. It is used to compensate the irreversible lithium ions consumed by the formation of the SEI film on the anode, so as to maintain the abundance of lithium ions in the battery system and improve the first-time charging efficiency and overall electrochemical performance of the battery. Moreover, the lithium-rich iron-based material has a high purity and low residual alkali on the surface, which enables the lithium-rich iron-based composite material with high capacity and good lithium supplementing effect, as well as good stability for storage and processing.

The doping element M in the lithium-rich iron-based material with the molecular formula of $aLiFeO_2 \cdot bLi_2O \cdot cM_xO_y$, can combine with $Li_2O$ contained in the lithium-rich iron-based material to utilize the capacity of the lithium-rich iron-based material, thereby enabling a high capacity of the lithium-rich iron-based composite material and the improving the kinetic extraction of lithium ions as well as the interface and structural stability of the lithium-rich iron-based composite material. In the embodiments, the doping element includes at least one of Ni, Co, Mn, Ti, Al, Cu, V, and Zr. These doping elements can further enhance the binding with $Li_2O$ so as to utilize the capacity of the lithium-rich iron-based material, thereby enabling a high capacity of the lithium-rich iron-based composite material. The anti-fluorite structure of theses metal doping elements with respect to iron-based materials improves the kinetic extraction of lithium ions as well as the interface and structural stability of the lithium-rich iron-based composite material.

The morphology of the lithium-rich iron-based material may be controlled as required, such as in the form of particles or other morphology. In the embodiments of this application, the particle morphology is relatively preferred. In addition, when the lithium-rich iron-based material is in the form of particles, it may be primary particles or secondary particles. In the embodiments, when the lithium-rich iron-based material is in the form of particles, the particle size thereof is 1 μm≤D50≤15 μm, D10/D50≥0.3, D90/D50≤2.

In an embodiment, when the lithium-rich iron-based material is in the form of particles, and the surface of the lithium-rich iron-based material is coated with a carbon coating layer, as shown in FIG. 1, the surface of the lithium-rich iron-based material 10 is coated with a carbon coating layer 20. The carbon coating layer 20 on the surface of the lithium-rich iron-based material 10 can effectively reduce the residual alkali content remaining on the surface of the lithium-rich iron-based material 10, effectively ensuring and improving the stability of storage and processing of the lithium-rich iron-based composite material. At the same time, the electrical conductivity of the lithium-rich iron-based material 10 is effectively improved, stimulating the specific capacity of the lithium-rich iron-based composite material, and realizing efficient lithium supplementation.

In a further embodiment, the thickness of the carbon coating layer 20 is 1-200 nm. In other embodiments, the carbon coating layer 20 accounts for 1 wt %-5 wt % of the total mass of the lithium-rich iron-based composite material. The thickness and content of the carbon coating layer 20 is controlled within this range, so as to reduce the residual alkali content remaining on the surface layer of the lithium-rich iron-based material 10, and to further improve the stability of storage and processing of the lithium-rich iron-based composite material, as well as the electrical conductivity of the lithium-rich iron-based material 10.

The morphology of the lithium-rich iron-based composite material in the above-mentioned embodiments may be particles, and obviously may also have other morphologies. In the embodiment, when the lithium-rich iron-based composite material is in the form of particles, the particle size of the lithium-rich iron-based composite material is such that: 1 μm≤D50≤15 μm, D10/D50≥0.3, D90/D50≤2. The inventors found that, when the lithium-rich iron-based composite material has a D50<1 μm, the particles of the lithium-rich iron-based composite material are small, and the specific surface area is too large, and the high activity leads to performance failure and degradation; when the lithium-rich iron-based composite material has a D50>15 μm, the particles are too large, and the migration distance of lithium ions is large, which may cause dynamic polarization and insufficient capacity. Therefore, in the embodiment, the specific surface area of the lithium-rich iron-based composite material is 0.5≤BET≤20 $m^2$/g. The particle size and specific surface area can enable the functions such as lithium supplementation and high capacity of the lithium-rich iron-based composite material to be fully utilized, and improve the dispersibility thereof.

After testing, in the above-mentioned embodiments, the resistivity of the lithium-rich iron-based composite material, especially the lithium-rich iron-based composite material containing the carbon coating layer 20 as shown in FIG. 1, has a resistivity of 1.0-1000 Ω/cm. It has low resistance and good electrical conductivity, and can effectively utilize the specific capacity of the lithium-rich iron-based composite material.

X-ray crystal phase analysis was carried out on the lithium-rich iron-based composite material in the above embodiments, it was found that peaks in ranges of 2Θ=16.7±0.5° and 33.7±0.5° in the X-ray diffraction spectrum of the lithium-rich iron-based composite materials originate from crystal planes (111) and (222) of $LiFeO_2 \cdot 2Li_2O$, and intensities of the peaks within the ranges of 2Θ=16.7±0.5° and 33.7±0.5° were respectively recorded as $I_a$ and $I_b$. In the embodiments, when $I_a/I_b \geq 0.26$, the lithium-rich iron-based composite material featured with this specific crystal phase has abundant lithium sources contributing to the capacity, thus has a high capacity.

Further XRD analysis indicated that a peak in a range of 2Θ=43.5±0.5° corresponded to a crystal plane (220) of $LiFeO_2$, an intensity of which was recorded as $I_c$. In the embodiment, when $I_a/I_c \geq 0.5$ on the basis of the above-mentioned conditions, the content of lithium sources contributing to the capacity is further enhanced, thereby improving the capacity of the lithium-rich iron-based composite material.

After further research by the inventors, it was found that if $I_a$, $I_b$, and $I_c$ in the crystal phase of the lithium-rich iron-based composite material deviate from the above-mentioned correlation, the effect of lithium supplementation is not ideal, and the capacity is reduced, which will lead to degradation in electrochemical performance, such as charging capacity and specific capacity, of the battery.

The XRD spectrum may be but not limited to CuKα ray.

The Raman spectrum analysis of the lithium-rich iron-based composite material in the above embodiments shows that, scattering peaks at wavelengths of 1330 $cm^{-1}$ and 1580 $cm^{-1}$ are observed in the Raman spectrum of lithium-rich iron-based composite material, and intensities of these scattering peaks were respectively recorded as $I_D$ and $I_G$. In the embodiments, when $I_D/I_G$<4.0, further, when $I_D/I_G$<3.0, the lithium-rich iron-based composite material has excellent electrical conductivity with a moderate amount of pores on the surface layer, hence it is not easy to absorb water during storage, so the performance of the lithium-rich iron-based composite material is stable. The inventors further found that when $I_D/I_G$ increases, such as greater than 4.0, the lithium-rich iron-based composite material demonstrates a decrease in electrical conductivity, and when the surface contains a carbon coating layer, the coking value of the carbon source is low, and there are more pores on the carbon coating layer, therefore, the material is not easy to store, and it is easy to absorb water in ambient environments, resulting in poor performance.

Figure 2:
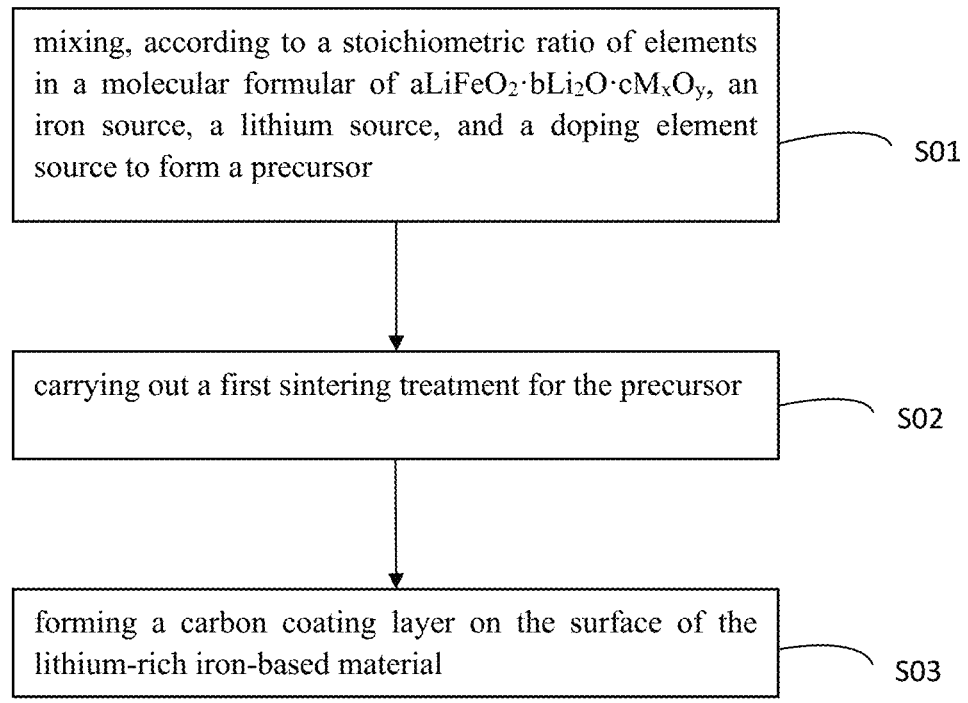
FIG. 2 is a flow chart of the preparation method of the lithium-rich iron-based composite material in an embodiment of the present application.

Correspondingly, the embodiment of the present application also provides a preparation method of the above-mentioned lithium-rich iron-based composite material. The flow chart of the preparation method of the lithium-rich iron-based composite material is shown in FIG. 2, including the following steps:

In step S01: an iron source, a lithium source and a doping element source are mixed according to the stoichiometric ratio of elements in the molecular formula, $aLiFeO_2 \cdot bLi_2O \cdot cM_xO_y$, to form a precursor; and In step S02: the precursor is subjected to the first sintering treatment to generate a lithium-rich iron-based material with a molecular formula of $aLiFeO_2 \cdot bLi_2O \cdot cM_xO_y$.

The lithium-rich iron-based material prepared by sintering the precursor according to the preparation method of the lithium-rich iron-based composite material has high purity and low residual alkali on the surface, which enables the lithium-rich iron-based composite material to exhibit high capacity and good lithium supplementing effect, as well as good stability for storage and processing.

In the molecular formula in step S01, a, b, and c are numbers of moles, and $0 \leq c/(a+b+c) \leq 0.02$, $1.8 \leq b/a \leq 2.1$, M is a doping element, and $1 \leq y/x \leq 2.5$. Therefore, the stoichiometric ratio of elements in step S01 may be a molar ratio, or may be a mass ratio converted from a molar ratio. In the embodiments, the iron source includes at least one of iron oxide, iron nitrate, iron chloride, iron hydroxide, iron acetate, and iron oxalate; the lithium source includes at least one of lithium hydroxide, lithium carbonate, lithium nitrate, lithium acetate, lithium oxide, and lithium oxalate; the doping element source includes at least one of Cu, Co, Al, Ti, Fe, V, and Zr sources. The iron source, lithium source and doping element source may be effectively mixed in proportion, and the cost of these raw materials is low, which effectively reduces the cost of the lithium-rich iron-based material. In addition, the source of doping elements may be selected and adjusted according to needs. In a specific embodiment, the Cu source may be at least one of copper oxide, copper nitrate, copper chloride, copper hydroxide, copper acetate, and copper carbonate; and the Co source may be at least one of cobalt oxide, cobalt nitrate, cobalt chloride, cobalt hydroxide, cobalt acetate, and cobalt carbonate; the Al source may be at least one of aluminum oxide, aluminum nitrate, aluminum chloride, aluminum acetate, and aluminum hydroxide; the Ti source may be at least one of titanium dioxide and titanium chloride; the Ni source may be at least one of nickel oxide, nickel nitrate, nickel chloride, nickel acetate, and nickel hydroxide; the V source may be at least one of vanadium pentoxide and vanadyl nitrate; and the Zr source may be at least one of zirconium oxide, zirconium nitrate, zirconium chloride, zirconium hydroxide, zirconium acetate, and zirconium carbonate.

Mixing ensures each source material is mixed evenly, therefore, the mixing treatment may be conventional mixing treatment, ideally is grinding treatment, which refines the particle size of each source compound in addition to being evenly mixed, thereby further improving uniformity of the mixture of various source materials, and improving the stability of the structure and electrochemical performance of the prepared lithium-rich iron-based material.

In a further embodiment, during the mixing process of the iron source, the lithium source, and the dopant element source in step S01, a carbon source is further added. By directly adding a carbon source to the precursor, the carbon source can be in-situ coated on the surface of the lithium-rich iron-based material particles as sintered, namely a carbon coating layer is formed on the surface of the lithium-rich iron-based material particles, by controlling the sintering treatment conditions, such as sintering in a non-oxygen environment in step S02. The generated carbon coating layer is the carbon coating layer in the lithium-rich iron-based composite material as mentioned above, that is, the carbon coating layer 20 in FIG. 1. In an embodiment, the total mass of the carbon source and the reactant is 5 wt %-50 wt %. In a specific embodiment, the carbon source includes at least one of citric acid, succinic acid, glucose, lactose, sucrose, starch, and polyethylene glycol. By selecting the amount and type of carbon source being added, the amount and the quality of the carbon coating layer are controlled.

In step S02, after the first sintering treatment is carried out on the precursor, a lithium-rich iron-based material with the molecular formula $aLiFeO_2 \cdot bLi_2O \cdot cM_xO$; is formed. In an embodiment, the temperature of the first sintering treatment is 600-1000° C., and the duration is 4-48 hours. In a further embodiment, the heating rate of the first sintering treatment is 10-500° C./h until the first sintering temperature is reached. By controlling and optimizing the sintering temperature and the heating rate, the purity of the lithium-rich iron-based material formed by sintering can be improved and residual alkali on the surface can be reduced, which enables the lithium-rich iron-based composite material to exhibit high capacity and good lithium supplementing effect, as well as good stability for storage and processing.

The first sintering treatment is followed by a second sintering treatment, which includes the following step:

crushing a product after the first sintering treatment and heating at 0-500° C./h to 600-1000° C. for a heat treatment of 1-20 h.

The second sintering treatment allows the reactants that did not participate in the reaction to be sintered into the expected product, thus improving the overall electrical performance of the composite material and reducing the residual alkali. In principle, the more sintering treatment that is carried out, the higher the purity. Therefore, the second sintering treatment may be performed multiple times, that is, more than two times, regardless the cost.

The lithium-rich iron-based material produced after the first sintering treatment or the second sintering treatment may be primary particles or secondary particles.

In a further embodiment, after step S02, specifically, after the first sintering treatment or the second sintering treatment, the method further includes step S03 as shown in FIG. 2:

forming a carbon coating layer, namely the carbon coating layer 20 as shown in FIG. 1, on the surface of the lithium-rich iron-based material.

By forming a carbon coating layer on the surface of the lithium-rich iron-based material, the surface of the lithium-rich iron-based material can be modified, which effectively reduces the residual alkali content remaining on the surface of the lithium-rich iron-based material, and enhances the stability for storage and processing. At the same time, the electrical conductivity of the lithium-rich iron-based material is effectively improved, stimulating the specific capacity of the lithium-rich iron-based composite material, and realizing efficient lithium supplementation.

The method for forming the carbon coating layer in step S03 may be a conventional carbon coating method, such as preparing a carbon source solution and then dispersing the lithium-rich iron-based material prepared in the previous steps in the carbon source solution, and forming a carbon source film layer on the surface of the lithium-rich iron-based material, and drying to form a carbon coating layer.

Alternatively, the carbon source can be melted, and the lithium-rich iron-based material can be dispersed in the molten carbon source, and a carbon source film layer is formed on the surface of the lithium-rich iron-based material, a carbonization treatment can be carried out after cooling and crushing, or cooling and crushing can be carried out after the carbonization treatment to form a carbon coating layer.

Of course, other methods such as non-aqueous solution may be applied to form a precursor coating layer on the surface of the lithium-rich iron-based material and a carbon coating layer is formed in situ on the surface of the lithium-rich iron-based material.

In addition, when the precursor in the above step S01 contains a carbon source, and the first sintering treatment or the subsequent second sintering treatment in step S02 is performed in a non-oxygen environment, then step S03 may be omitted, or the carbon coating treatment in step S03 may also be carried out.

In addition, when the precursor in the above step S01 contains a carbon source, and the first sintering treatment or the subsequent second sintering treatment in step S02 is performed in an oxygen environment, step S03 is preferably performed for carbon coating on the surface of the lithium-rich iron-based material.

When the precursor in the above step S01 does not contain a carbon source, after the first sintering treatment or the second sintering treatment in step S02, step S03 is preferably carried out, and carbon coating is carried out on the surface of the lithium-rich iron-based material.

By controlling the content of the carbon source in step S01 or further controlling the amount of carbon coating in step S03, the thickness of the carbon coating layer is controlled within the thickness range described above, or the carbon coating layer is further controlled to account for 1 wt %-5 wt % of the total mass of the lithium-rich iron-based composite material, thus the carbon coating layer can function as mentioned above.

Therefore, the preparation method of a lithium-rich iron-based composite material ensures that the lithium-rich iron-based material obtained is rich in lithium, and has s a high purity and low residual alkali on the surface, which enables the lithium-rich iron-based composite material with high capacity and good lithium supplementing effect, as well as good stability for storage and processing. In addition, the preparation method of a lithium-rich iron-based composite material can ensure that the prepared lithium-rich iron-based composite material has a stable structure and electrochemical performance, and has high efficiency and saves production costs.

Yet another aspect of the present application provides a lithium-supplementing additive for cathodes. The lithium-supplementing additive for cathodes of the present application may be the above-mentioned lithium-rich iron-based composite material of the present application, obviously, may be other additives suitable for cathodes, or auxiliary additives which are beneficial to lithium supplementation of the lithium-rich iron-based composite material. When other additives are included, the ratio between the lithium-rich iron-based composite material and the additives may be adjusted according to the needs of practical applications. Since the lithium-supplementing additive for cathodes in the present application has the lithium-rich iron-based composite material of the present application, thus the lithium-supplementing additive for cathodes, as a lithium source, can be used as a "sacrificial agent" during the first cycle of charging process to compensate the irreversible lithium ions consumed by the formation of the SEI film on the anode, so as to maintain the abundance of lithium ions in the battery system and improve the first-time charging efficiency and overall electrochemical performance of the battery.

Still another aspect of the present application provides a cathode material, which includes lithium-supplementing additives. The lithium-supplementing additive may be the above-mentioned lithium-rich iron-based composite material of the present application, obviously, the cathode material may also include cathode materials in the field of lithium-ion batteries. Since the cathode material in the present application has the lithium-rich iron-based composite material in the embodiments of the present application, thus the lithium-rich iron-based composite material, as a lithium source, in the cathode material can be used as a "sacrificial agent" during the first cycle of charging process to compensate the irreversible lithium ions consumed by the formation of the SEI film on the anode, so as to maintain the abundance of lithium ions in the battery system and improve the first-time charging efficiency and overall electrochemical performance of the battery.

In the embodiments, the content of the lithium-rich iron-based composite material in the cathode material in the above application example is 0.5 wt %-10 wt %. By controlling and optimizing the content of the lithium-rich iron-based composite material in the cathode material, the lithium-rich iron-based composite material can be fully utilized in the above functions.

Meanwhile, based on the cathode material of the embodiment of the present application, the embodiment of the present application also provides a cathode and a lithium-ion battery containing the cathode in the embodiments of the present application.

The active material contained in the cathode is the above-mentioned cathode material in the embodiments of the present application. The cathode can be a conventional cathode of a lithium-ion battery, such as including a current collector and a cathode active layer combined on the surface of the current collector.

The cathode current collector includes but not limited to any one of a copper foil and an aluminum foil.

The cathode active layer contains the cathode material in the above embodiments of the present application, that is, contains the lithium supplement additive, and specifically contains the lithium-rich iron-based composite material or the lithium-supplementing additive for cathodes in the above embodiments of the present application. In the embodiments, the lithium-supplementing additive, that is, the lithium-rich iron-based composite material or the lithium-supplementing additive for cathodes in the above embodiments of the present application, has a mass content of 0.5 wt %-10 wt % in the cathode active layer; specifically, it may be 0.5 wt %, 1 wt %, 2 wt %, 3 wt %, 4 wt %, 5 wt %, 6 wt %, 7 wt %, 8 wt %, 9 wt %, 10 wt %, etc., preferably 1 wt %-6 wt %, more preferably 3 wt %-6 wt %.

The cathode active layer further includes a cathode active material, a binder and a conductive agent in addition to the lithium-supplementing additive.

In an embodiment, the cathode active material includes at least one of lithium cobalt oxide, lithium iron phosphate, lithium manganese iron phosphate, lithium manganate, lithium nickel cobalt manganate, and lithium nickel manganese oxide.

In an embodiment, a content of the binder in the cathode active layer is 0.5 wt %-3 wt %. In a specific embodiment, the binder includes one or more of polyvinylidene chloride, soluble polytetrafluoroethylene, styrene-butadiene rubber, hydroxypropyl methyl cellulose, methyl cellulose, carboxymethyl cellulose, polyvinyl alcohol, acrylonitrile copolymer, sodium alginate, chitosan and chitosan derivatives.

In an embodiment, the content of the conductive agent in the cathode active layer is 0.2 wt %-5 wt %. In a specific embodiment, the conductive agent includes one or more of graphite, carbon black, acetylene black, graphene, carbon fiber, C60 and carbon nanotube.

In an embodiment, the preparation of the cathode is as follows: the cathode active material, the lithium-supplementing additive, the conductive agent and the binder are mixed to obtain an electrode slurry, the electrode slurry is applied on the current collector, followed by drying, rolling, die-cutting and so on to prepare the cathode sheet.

Accordingly, the lithium-ion battery in an embodiment of the present application includes the cathode. Apparently, the lithium-ion battery of the embodiment of the present application also includes necessary components such as an anode, a separator, and an electrolyte that are necessary for the lithium-ion battery.

Since the cathode contains the lithium-rich iron-based composite material or the lithium-supplementing additive for cathodes in the above embodiment of the present application, therefore, during the first-time charging of the lithium-ion battery in the embodiment of the present application, the cathode includes the lithium-supplementing additive in the above embodiments of the present application, which can be used as a "sacrificial agent" to release all the lithium ions at once as much as possible, so as to compensate the irreversible lithium ions consumed by the formation of the SEI film on the anode, maintaining the abundance of lithium ions in the battery system and improving the first-time charging efficiency and overall electrochemical performance of the battery.

A plurality of examples are used below to illustrate the lithium-rich iron-based composite material and its preparation method and application of the present application.

1. Lithium-Rich Iron-Based Composite Material and its Preparation Method

Example 11

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O$, and a carbon coating layer covering the lithium-rich iron-based material.

The preparation method of the lithium-rich iron-based composite material includes the following steps:

In S1, $Fe(NO_3)_3 \cdot 9H_2O$ and $LiNO_3$ were added into a citric acid aqueous solution of 15 wt % with a molar ratio of 1:4.98, and were mixed well, spray-dried at 280° C. and crushed to obtain a precursor; and In S2, in a nitrogen atmosphere, the precursor was heated up to 850° C. at a rate of 300° C./h and held for 15 hours. After cooling, the product was mechanically crushed and classified to obtain in-situ carbon-coated $LiFeO_2 \cdot 1.99Li_2O$ powder.

After testing, the average particle size of the in-situ carbon-coated $LiFeO_2 \cdot 1.99Li_2O$ powder is 12.3 μm, and the thickness of the carbon coating layer is 17 nm, BET is 9.4 $m^2/g$.

Example 12

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O \cdot 0.005Al_2O_3$, and a carbon coating layer covering the lithium-rich iron-based material.

The preparation method of the lithium-rich iron-based composite material includes the following steps:

In S1, $Fe(NO_3)_3 \cdot 9H_2O$, $LiNO_3$ and $Al(NO_3)_3$ were added into a citric acid aqueous solution of 15 wt % with a molar ratio of 1:4.98:0.01, and were mixed well, spray-dried at 280° C. and crushed to obtain a precursor; and In S2, in a nitrogen atmosphere, the precursor was heated up to 850° C. at a rate of 300° C./h and held for 15 hours. After cooling, the product was mechanically crushed and classified to obtain in-situ carbon-coated $LiFeO_2 \cdot 1.99Li_2O \cdot 0.005Al_2O_3$ powder.

After testing, the average particle size of the in-situ carbon-coated $LiFeO_2 \cdot 1.99Li_2O \cdot 0.005Al_2O_3$ powder is 11.2 μm, and the thickness of the carbon coating layer is 21 nm, BET is 8.7 $m^2/g$.

Example 13

This example provides a lithium-rich iron-based composite material and a preparation method thereof. The structure of the lithium-rich iron-based composite material is shown in FIG. 1, including a lithium-rich iron-based material, $LiFeO_2 \cdot 2.05Li_2O \cdot 0.015COO$, and a carbon coating layer covering the lithium-rich iron-based material.

The preparation method of the lithium-rich iron-based composite material includes the following steps:

In S1, $Fe(NO_3)_3 \cdot 9H_2O$, LiOH, and $Co(NO_3)_3$ were added into a citric acid aqueous solution of 15 wt % with a molar ratio of 1:5.1:0.015, and were mixed well, spray-dried at 280° C. and crushed to obtain a precursor; and In S2, in a nitrogen atmosphere, the precursor was heated up to 800° ° C. at a rate of 300° C./h and held for 20 hours. After cooling, the product was mechanically crushed and classified to obtain in-situ carbon-coated $LiFeO_2 \cdot 2.05Li_2O \cdot 0.015CoO$ powder.

After testing, the average particle size of the in-situ carbon-coated $LiFeO_2 \cdot 2.05Li_2O \cdot 0.015COO$ powder is 7.8 μm, and the thickness of the carbon coating layer is 35 nm, BET is 16 $m^2/g$.

Example 14

This example provides a lithium-rich iron-based composite material and a preparation method thereof. The structure of the lithium-rich iron-based composite material is shown in FIG. 1, including a lithium-rich iron-based material, $LiFeO_2 \cdot 2.05Li_2O \cdot 0.015ZrO_2$, and a carbon coating layer covering the lithium-rich iron-based material.

The preparation method of the lithium-rich iron-based composite material includes the following steps:

In S1, $FeCl_3$, $Li_2CO_3$, and $ZrCl_4$ were added into a citric acid aqueous solution of 15 wt % with a molar ratio of 1:2.55:0.015, and were mixed well, spray-dried at 280° C. and crushed to obtain a precursor; and In S2, in a nitrogen atmosphere, the precursor was heated up to 800° C. at a rate of 300° C./h and held for 20 hours. After cooling, the product was mechanically crushed and classified to obtain in-situ carbon-coated $LiFeO_2 \cdot 2.05Li_2O \cdot 0.015ZrO_2$ powder.

After testing, the average particle size of the in-situ carbon-coated $LiFeO_2 \cdot 2.05Li_2O \cdot 0.015ZrO_2$ powder is 7.3 μm, and the thickness of the carbon coating layer is 19 nm, BET is 6.2 $m^2/g$.

Example 15

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O \cdot 0.005Al_2O_3$, and a carbon coating layer covering the lithium-rich iron-based material.

The preparation method of the lithium-rich iron-based composite material includes the following steps:

In S1, $Fe(NO_3)_3 \cdot 9H_2O$, $LiNO_3$, and $Al(NO_3)_3$ were added into a citric acid aqueous solution of 15 wt % with a molar ratio of 1:4.98:0.01, and were mixed well, spray-dried at 280° C. and crushed to obtain a precursor; and In S2, in a nitrogen atmosphere, the precursor was heated up to 850° C. at a rate of 300° C./h and held for 15 hours. After cooling, the product was mechanically crushed and classified to obtain in-situ carbon-coated $LiFeO_2 \cdot 1.99Li_2O \cdot 0.005Al_2O_3$ powder.

After testing, the average particle size of the in-situ carbon-coated $LiFeO_2 \cdot 1.99Li_2O \cdot 0.005Al_2O_3$ powder is 9 μm, and the thickness of the carbon coating layer is 40 nm, BET is 5.2 $m^2/g$.

Example 16

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O \cdot 0.01CuO$, and a carbon coating layer covering the lithium-rich iron-based material.

The preparation method of the lithium-rich iron-based composite material includes the following steps:

In S1, $Fe_2O_3$, LiOH, and CuO were mixed well with a molar ratio of 1:10.1:0.01 to obtain a precursor;

In S2, in a nitrogen atmosphere, the precursor was heated up to 900° C. at a rate of 300° C./h and held for 20 hours. After cooling, the product was mechanically crushed and classified to obtain $LiFeO_2 \cdot 1.99Li_2O \cdot 0.01CuO$ powder; and In S3, the crushed powder was placed into the rotary furnace under nitrogen, and was heated up to 900° C. at a rate of 200° C./h, a carbon heat treatment was carried out by using a carbon source, a carbon coating layer was formed on the surface of $LiFeO_2 \cdot 1.99Li_2O \cdot 0.01CuO$ powder, and the powder was cooled down to obtain carbon-coated $LiFeO_2 \cdot 1.99Li_2O \cdot 0.01CuO$ powder.

After testing, the average particle size of the in-situ carbon-coated $LiFeO_2 \cdot 1.99Li_2O \cdot 0.01CuO$ powder is 6 μm, and the thickness of the carbon coating layer is 32 nm, and BET is 4.5 $m^2/g$.

Example 17

This example provides a lithium-rich iron-based composite material and a preparation method thereof. The structure of the lithium-rich iron-based composite material is shown in FIG. 1, including a lithium-rich iron-based material, $LiFeO_2 \cdot 2.025Li_2O \cdot 0.01CuO$, and a carbon coating layer covering the lithium-rich iron-based material.

The preparation method of the lithium-rich iron-based composite material includes the following steps:

In S1, $Fe_2O_3$, LiOH, and CuO were mixed well with a molar ratio of 1:10.1:0.01 to obtain a precursor;

In S2, in a nitrogen atmosphere, the precursor was heated up to 900° C. at a rate of 300° C./h and held for 20 hours. After cooling, the product was mechanically crushed and classified to obtain $LiFeO_2 \cdot 2.025Li_2O \cdot 0.01CuO$ powder; and In S3, the crushed powder was placed into the rotary furnace under nitrogen, and was heated up to 900° C. at a rate of 200° C./h, a carbon heat treatment was carried out by using a carbon source, a carbon coating layer was formed on the surface of $LiFeO_2 \cdot 2.025Li_2O \cdot 0.01CuO$ powder, and the powder was cooled down to obtain carbon-coated $LiFeO_2 \cdot 2.025Li_2O \cdot 0.01CuO$ powder.

After testing, the average particle size of the in-situ carbon-coated $LiFeO_2 \cdot 2.025Li_2O \cdot 0.01CuO$ powder is 3 μm, and the thickness of the carbon coating layer is 22 nm, and BET is 17 $m^2/g$.

Example 18

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O \cdot 0.01MnO_2$, and a carbon coating layer covering the lithium-rich iron-based material.

The preparation method of the lithium-rich iron-based composite material includes the following steps:

In S1, $Fe_2O_3$, LiOH, and $MnO_2$ were mixed well with a molar ratio of 1:10.1:0.01 to obtain a precursor;

In S2, in a nitrogen atmosphere, the precursor was heated up to 900° C. at a rate of 300° C./h and held for 20 hours, after cooling, the product was mechanically crushed and classified to obtain $LiFeO_2 \cdot 1.99Li_2O \cdot 0.01MnO_2$ powder; and In S3, the crushed powder was placed into the rotary furnace under nitrogen, and was heated up to 700° C. at a rate of 200° C./h, a carbon heat treatment was carried out by using a carbon source, a carbon coating layer was formed on the surface of $LiFeO_2 \cdot 1.99Li_2O \cdot 0.01MnO_2$ powder, and the powder was cooled down to obtain carbon-coated $LiFeO_2 \cdot 1.99Li_2O \cdot 0.01MnO_2$ powder.

After testing, the average particle size of the in-situ carbon-coated $LiFeO_2 \cdot 1.99Li_2O \cdot 0.01MnO_2$ powder is 2.3 μm, and the thickness of the carbon coating layer is 17 nm, and BET is 18 $m^2/g$.

Example 19

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O \cdot 0.005Al_2O_3$, and a carbon coating layer covering the lithium-rich iron-based material.

The preparation method of the lithium-rich iron-based composite material includes the following steps:

In S1, $Fe(NO_3)_3 \cdot 9H_2O$, $LiNO_3$, and $Al(NO_3)_3$ were added into a citric acid aqueous solution of 15 wt % with a molar ratio of 1:4.98:0.01, and were mixed well, spray-dried at 280° C. and crushed to obtain a precursor;

In S2, in a nitrogen atmosphere, the precursor was heated up to 850° C. at a rate of 300° C./h and held for 15 hours, after cooling, the product was mechanically crushed and classified to obtain $LiFeO_2 \cdot 1.99Li_2O \cdot 0.005Al_2O_3$ powder; and In S3, the crushed powder was placed into the rotary furnace under nitrogen, and was heated up to 900° C. at a rate of 200° C./h, a carbon heat treatment was carried out by using a carbon source, a carbon coating layer was formed on the surface of $LiFeO_2 \cdot 1.99Li_2O \cdot 0.005Al_2O_3$ powder, and the powder was cooled down to obtain carbon-coated $LiFeO_2 \cdot 1.99Li_2O \cdot 0.005Al_2O_3$ powder.

After testing, the average particle size of the in-situ carbon-coated $LiFeO_2 \cdot 1.99Li_2O \cdot 0.005Al_2O_3$ powder is 11.4 µm, and the thickness of the carbon coating layer is 130 nm, and BET is 21 $m^2/g$.

Example 20

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O \cdot 0.005Al_2O_3$, and a carbon coating layer covering the lithium-rich iron-based material.

The preparation method of the lithium-rich iron-based composite material includes the following steps:

In S1, $Fe(NO_3)_3 \cdot 9H_2O$, $LiNO_3$, and $Al(NO_3)_3$ were added into a citric acid aqueous solution of 40 wt % with a molar ratio of 1:4.98:0.01, and were mixed well, spray-dried at 280° C. and crushed to obtain a precursor; and In S2, in a nitrogen atmosphere, the precursor was heated up to 850° C. at a rate of 300° C./h and held for 15 hours, after cooling, the product was mechanically crushed and classified to obtain $LiFeO_2 \cdot 1.99Li_2O \cdot 0.005Al_2O_3$ powder.

After testing, the average particle size of the in-situ carbon-coated $LiFeO_2 \cdot 1.99Li_2O \cdot 0.005Al_2O_3$ powder is 11.3 µm, and the thickness of the carbon coating layer is 110 nm, and BET is 15 $m^2/g$.

Example 21

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O \cdot 0.005Al_2O_3$, and a carbon coating layer covering the lithium-rich iron-based material.

The preparation method of the lithium-rich iron-based composite material includes the following steps:

In S1, $Fe(NO_3)_3 \cdot 9H_2O$, $LiNO_3$, and $Al(NO_3)_3$ were added into a citric acid aqueous solution of 15 wt % with a molar ratio of 1:4.98:0.01, and were mixed well, spray-dried at 280° C. and crushed to obtain a precursor;

In S2, in a nitrogen atmosphere, the precursor was heated up to 850° C. at a rate of 300° C./h and held for 15 hours, after cooling, the product was mechanically crushed and classified to obtain $LiFeO_2 \cdot 1.99Li_2O \cdot 0.005Al_2O_3$ powder; and In S3, the crushed powder was placed into the rotary furnace under nitrogen, and was heated up to 700° C. at a rate of 200° C./h, a carbon heat treatment was carried out by using a carbon source, a carbon coating layer was formed on the surface of $LiFeO_2 \cdot 1.99Li_2O \cdot 0.005Al_2O_3$ powder, and the powder was cooled down to obtain carbon-coated $LiFeO_2 \cdot 1.99Li_2O \cdot 0.005Al_2O_3$ powder.

Example 22

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O$, and a carbon coating layer covering the lithium-rich iron-based material.

The preparation method of the lithium-rich iron-based composite material includes the following steps:

In S1, $Fe(NO_3)_3 \cdot 9H_2O$ and $LiNO_3$ were mixed well with a molar ratio of 1:4.98, and spray-dried at 280° C. and crushed to obtain a precursor;

In S2, in a nitrogen atmosphere, the precursor was heated up to 850° C. at a rate of 300° C./h and held for 15 hours, after cooling, the product was mechanically crushed and classified to obtain $LiFeO_2 \cdot 1.99Li_2O$ powder; and In S3, the crushed powder was placed into the rotary furnace under nitrogen, and was heated up to 900° C. at a rate of 200° C./h, a carbon heat treatment was carried out by using a carbon source, a carbon coating layer was formed on the surface of $LiFeO_2 \cdot 1.99Li_2O$ powder, and the powder was cooled down to obtain carbon-coated $LiFeO_2 \cdot 1.99Li_2O$ powder.

Example 23

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O \cdot 0.005Al_2O_3$, and a carbon coating layer covering the lithium-rich iron-based material.

The preparation method of the lithium-rich iron-based composite material includes the following steps:

In S1, $Fe(NO_3)_3 \cdot 9H_2O$, $LiNO_3$, and $Al(NO_3)_3$ were mixed well with a molar ratio of 1:4.98:0.01, and spray-dried at 280° C. and crushed to obtain a precursor;

In S2, in a nitrogen atmosphere, the precursor was heated up to 850° C. at a rate of 300° C./h and held for 15 hours, after cooling, the product was mechanically crushed and classified to obtain $LiFeO_2 \cdot 1.99Li_2O \cdot 0.005Al_2O_3$ powder; and In S3, the crushed powder was placed into the rotary furnace under nitrogen, and was heated up to 600° C. at a rate of 200° C./h, a carbon heat treatment was carried out by using a carbon source, a carbon coating layer was formed on the surface of $LiFeO_2 \cdot 1.99Li_2O \cdot 0.005Al_2O_3$ powder, and the powder was cooled down to obtain carbon-coated $LiFeO_2 \cdot 1.99Li_2O \cdot 0.005Al_2O_3$ powder.

Example 24

This example provides a lithium-rich iron-based composite material and a preparation method thereof. The structure of the lithium-rich iron-based composite material is shown in FIG. 1, including a lithium-rich iron-based material, $LiFeO_2 \cdot 2.05Li_2O \cdot 0.015COO$, and a carbon coating layer covering the lithium-rich iron-based material.

The preparation method of the lithium-rich iron-based composite material includes the following steps:
- In S1, $Fe(NO_3)_3 \cdot 9H_2O$, LiOH, and $Co(NO_3)_3$ were mixed well with a molar ratio of 1:5.1:0.015, and spray-dried at 280° C. and crushed to obtain a precursor;
- In S2, in a nitrogen atmosphere, the precursor was heated up to 800° C. at a rate of 300° C./h and held for 20 hours, after cooling, the product was mechanically crushed and classified to obtain $LiFeO_2 \cdot 2.05Li_2O \cdot 0.015CoO$ powder; and
- In S3, the crushed powder was placed into the rotary furnace under nitrogen, and was heated up to 700° ° C. at a rate of 200° C./h, a carbon heat treatment was carried out by using a carbon source, a carbon coating layer was formed on the surface of $LiFeO_2 \cdot 2.05Li_2O \cdot 0.015CoO$ powder, and the powder was cooled down to obtain carbon-coated $LiFeO_2 \cdot 2.05Li_2O \cdot 0.015CoO$ powder.

Example 25

This example provides a lithium-rich iron-based composite material and a preparation method thereof. The structure of the lithium-rich iron-based composite material is shown in FIG. 1, including a lithium-rich iron-based material, $LiFeO_2 \cdot 1.99Li_2O \cdot 0.01CuO$, and a carbon coating layer covering the lithium-rich iron-based material.

The preparation method of the lithium-rich iron-based composite material includes the following steps:
- In S1, $Fe_2O_3$, LiOH, and CuO were mixed well with a molar ratio of 1:10.1:0.01 to obtain a precursor;
- In S2, in a nitrogen atmosphere, the precursor was heated up to 900° ° C. at a rate of 300° C./h and held for 20 hours, after cooling, the product was mechanically crushed and classified to obtain $LiFeO_2 \cdot 1.99Li_2O \cdot 0.01CuO$ powder; and
- In S3, the crushed powder was placed into the rotary furnace under nitrogen, and was heated up to 900° C. at a rate of 200° C./h, a carbon heat treatment was carried out by using a carbon source, a carbon coating layer was formed on the surface of $LiFeO_2 \cdot 1.99Li_2O \cdot 0.01CuO$ powder, and the powder was cooled down to obtain carbon-coated $LiFeO_2 \cdot 1.99Li_2O \cdot 0.01CuO$ powder.

Comparative Example 11

The present comparative example provides a lithium-rich iron-based material and a preparation method thereof. The lithium-rich iron-based material is $LiFeO_2 \cdot 1.99Li_2O$.

The preparation method of the lithium-rich iron-based material includes the following steps:

$Fe(NO_3)_3 \cdot 9H_2O$ and $LiNO_3$ were added into a citric acid aqueous solution of 15 wt % with a molar ratio of 1:4.98, and were mixed well, spray-dried at 280° C. and crushed to obtain a precursor. In an air atmosphere, the precursor was heated up to 850° C. at a rate of 300° C./h and held for 15 hours, after cooling, the product was mechanically crushed and classified to obtain $LiFeO_2 \cdot 1.99Li_2O$ powder.

Comparative Example 12

An existing LCO material is directly obtained.

Comparative Example 13

This comparative example provides a lithium-rich iron-based composite material and a preparation method thereof. The structure of the lithium-rich iron-based composite material is shown in FIG. 1, including a lithium-rich iron-based material, $LiFeO_2 \cdot 1.49Li_2O \cdot 0.005Al_2O_3$, and a carbon coating layer covering the lithium-rich iron-based material.

The preparation method of the lithium-rich iron-based composite material of this comparative example includes the following steps:
- In S1, $Fe(NO_3)_3 \cdot 9H_2O$, $LiNO_3$, and $Al(NO_3)_3$ were added into a citric acid aqueous solution of 15 wt % with a molar ratio of 1:3.98:0.01, and were mixed well, spray-dried at 280° ° C. and crushed to obtain a precursor;
- In S2, in an air atmosphere, the precursor was heated up to 850° C. at a rate of 300° C./h and held for 15 hours, after cooling, the product was mechanically crushed and classified to obtain $LiFeO_2 \cdot 1.49Li_2O \cdot 0.005Al_2O_3$ powder; and
- In S3, the crushed powder was placed into the rotary furnace under nitrogen, and was heated up to 900° C. at a rate of 200° C./h, a carbon heat treatment was carried out by using a carbon source, a carbon coating layer was formed on the surface of $LiFeO_2 \cdot 1.49Li_2O \cdot 0.005Al_2O_3$ powder, and the powder was cooled down to obtain carbon-coated $LiFeO_2 \cdot 1.49Li_2O \cdot 0.005Al_2O_3$ powder.

Comparative Example 14

This comparative example provides a lithium-rich iron-based composite material and a preparation method thereof. The structure of the lithium-rich iron-based composite material is shown in FIG. 1, including a lithium-rich iron-based material, $LiFeO_2 \cdot 1.6Li_2O \cdot 0.005Al_2O_3$, and a carbon coating layer covering the lithium-rich iron-based material.

The preparation method of the lithium-rich iron-based composite material of this comparative example includes the following steps:
- In S1, $Fe(NO_3)_3 \cdot 9H_2O$, $LiNO_3$, and $Al(NO_3)_3$ were added into a citric acid aqueous solution of 15 wt % with a molar ratio of 1:4.22:0.01, and were mixed well, spray-dried at 280° C. and crushed to obtain a precursor;
- In S2, in an air atmosphere, the precursor was heated up to 850° C. at a rate of 300° ° C./h and held for 15 hours, after cooling, the product was mechanically crushed and classified to obtain $LiFeO_2 \cdot 1.6Li_2O \cdot 0.005Al_2O_3$ powder; and
- In S3, the crushed powder was placed into the rotary furnace under nitrogen, and was heated up to 900° ° C. at a rate of 200° C./h, a carbon heat treatment was carried out by using a carbon source, a carbon coating layer was formed on the surface of $LiFeO_2 \cdot 1.6Li_2O \cdot 0.005Al_2O_3$ powder, and the powder was cooled down to obtain carbon-coated $LiFeO_2 \cdot 1.6Li_2O \cdot 0.005Al_2O_3$ powder.

Comparative Example 15

This comparative example provides a lithium-rich iron-based composite material and a preparation method thereof. The structure of the lithium-rich iron-based composite material is shown in FIG. 1, including a lithium-rich iron-based material, $LiFeO_2 \cdot 1.49Li_2O \cdot 0.005Al_2O_3$, and a carbon coating layer covering the lithium-rich iron-based material.

The preparation method of the lithium-rich iron-based composite material of this comparative example includes the following steps:
In S1, $Fe(NO_3)_3 \cdot 9H_2O$, $LiNO_3$, and $Al(NO_3)_3$ were added into a glucose solution of 15 wt % with a molar ratio of 1:3.98:0.01, and were mixed evenly; and
In S2, in a nitrogen atmosphere, the precursor was heated up to 850° C. at a rate of 300° C./h and held for 15 hours, after cooling, the product was mechanically crushed and classified to obtain $LiFeO_2 \cdot 1.49Li_2O \cdot 0.005Al_2O_3$ powder.

2. Example of Lithium-Ion Battery

The lithium-rich iron-based composite materials provided in the above-mentioned Examples 11 to 25 and the lithium-rich iron-based materials provided in Comparative Example 11 to 15 were respectively prepared into cathodes and lithium-ion batteries were assembled, according to the following methods:
Cathode: the lithium-supplementing additive was mixed with lithium cobaltate at a mass ratio of 5:95 to obtain a mixture, the mixture was mixed and ball-milled with polyvinylidene fluoride and SP—Li at a mass ratio of 93:3:4 to obtain a cathode slurry, and the cathode slurry was coated on a surface of aluminum foil, and, after rolling, vacuum-dried at 110° C. overnight to obtain a cathode sheet;
Anode: a lithium metal sheet;
Electrolyte: ethylene carbonate and ethyl methyl carbonate were mixed at a volume ratio of 3:7, and $LiPF_6$ was added to form an electrolyte, the concentration of $LiPF_6$ is 1 mol/L;
Diaphragm: Polypropylene microporous diaphragm.
Assembly of the lithium-ion batteries: lithium-ion batteries were assembled in an inert atmosphere glove box according to the assembly sequence of lithium metal sheet-diaphragm-electrolyte-cathode sheet.

Related Characteristic Tests

Figure 3:
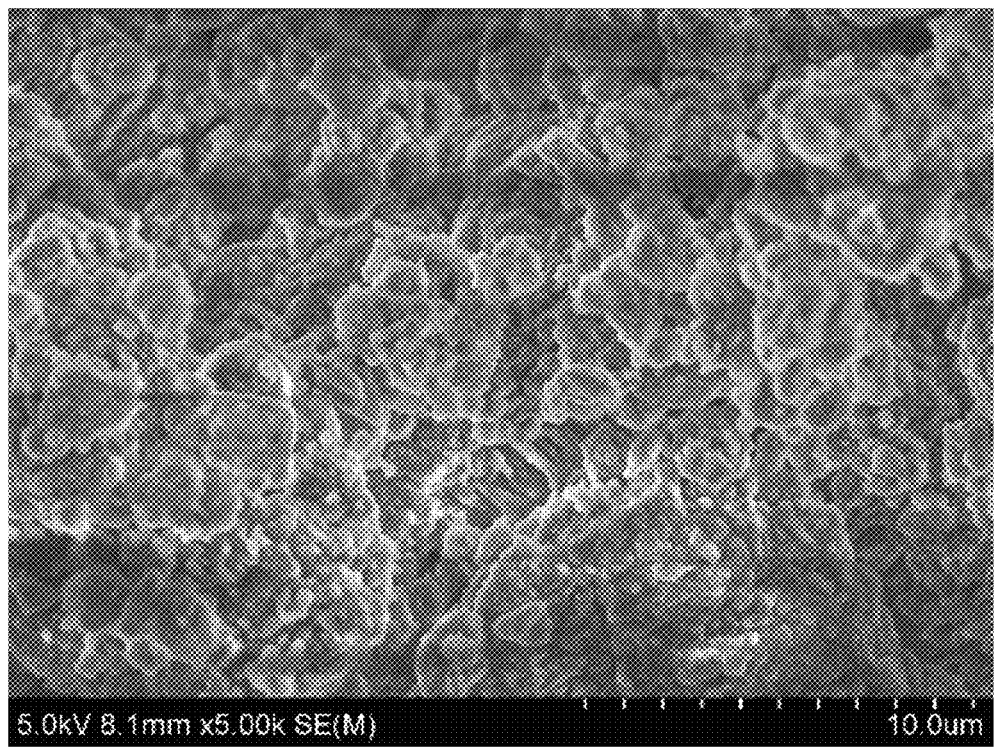
FIG. 3 is an SEM image of the lithium-rich iron-based composite material provided in Example 11.
Figure 4:
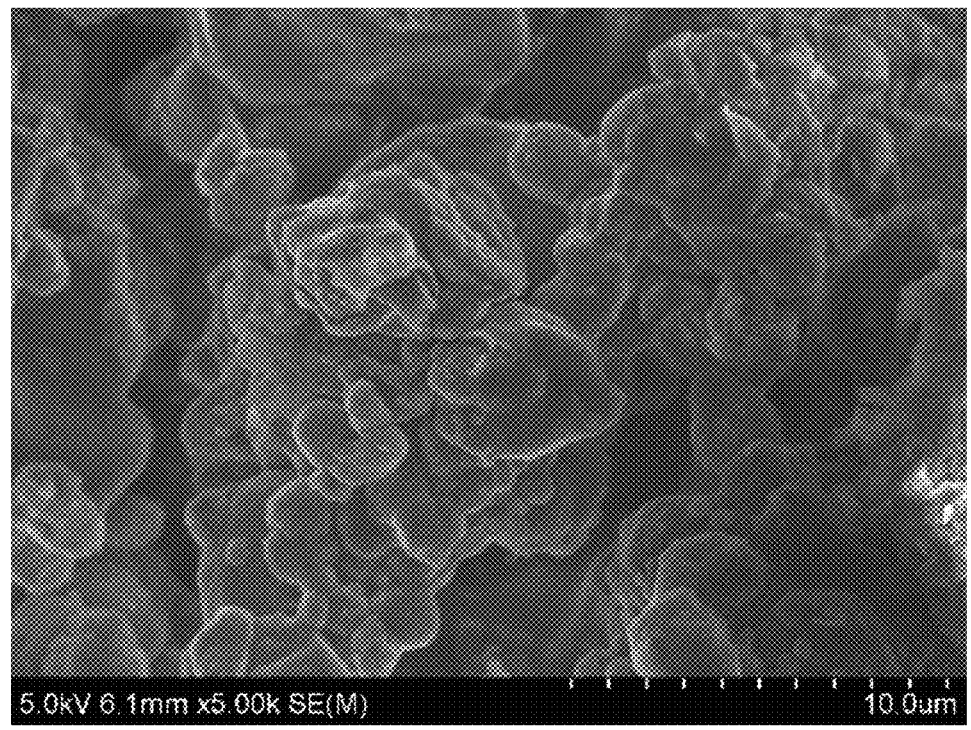
FIG. 4 is an SEM image of the lithium-rich iron-based composite material provided in Example 12.
Figure 5:
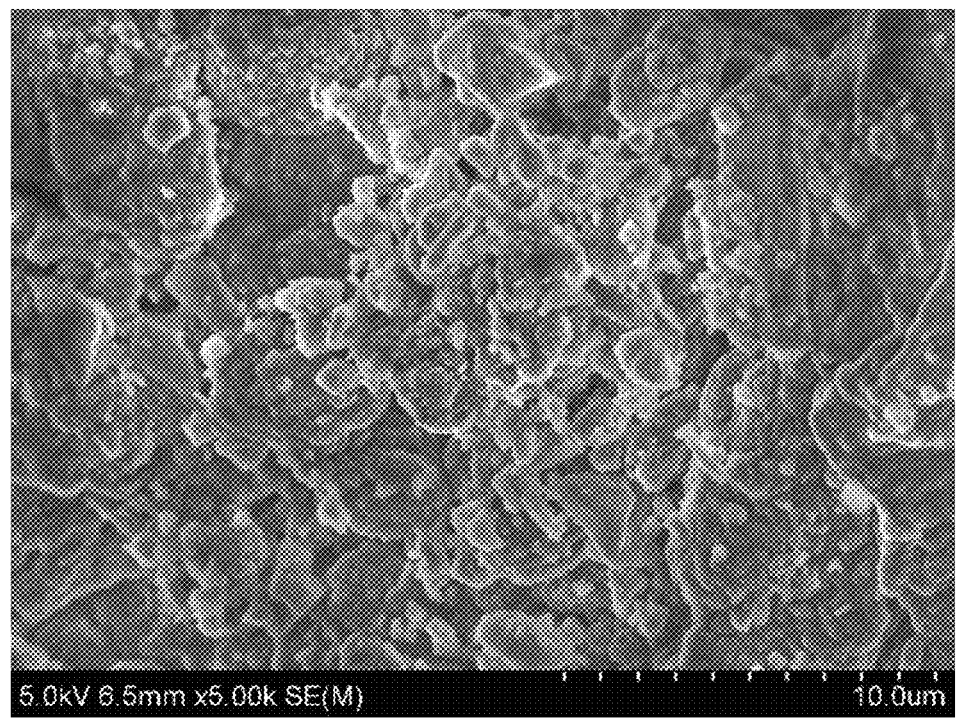
FIG. 5 is an SEM image of the lithium-rich iron-based composite material provided in Comparative Example 11.

1. Characterization of Lithium-Rich Iron-Based Composite Materials:

1.1 The lithium-rich iron-based composite materials obtained from Examples 11 and 15, and Comparative example 11 were characterized using SEM. Referring to FIGS. 3-5, FIG. 3 is an SEM image of the lithium-rich iron-based composite material provided in Example 11 of the present application, FIG. 4 is an SEM image of the lithium-rich iron-based composite material provided in Example 15 of the present application, and FIG. 5 is an SEM image of the lithium-rich iron-based composite material provided in Comparative example 11 of the present application. It can be seen from FIG. 3 that the in-situ carbon-coated lithium-rich iron-based composite material in Example 11 has many irregular particles and the interface is relatively rough. It can be seen from FIG. 4 that the surface of the lithium-rich iron-based composite material in Example 15 is relatively smooth. It is found from FIG. 5 that the interface of the uncoated lithium-rich iron-based composite material is also relatively rough.

Figure 6:
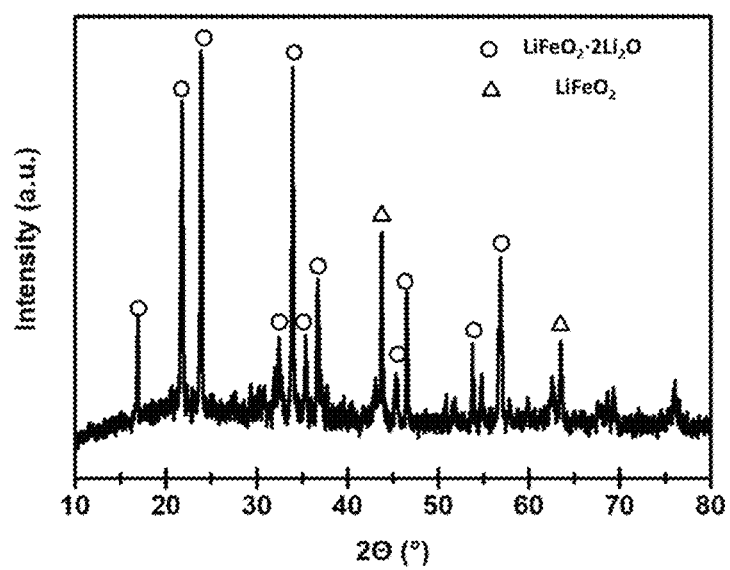
FIG. 6 is an X-ray diffraction pattern of the lithium-rich iron-based composite material in Example 11.
Figure 7:
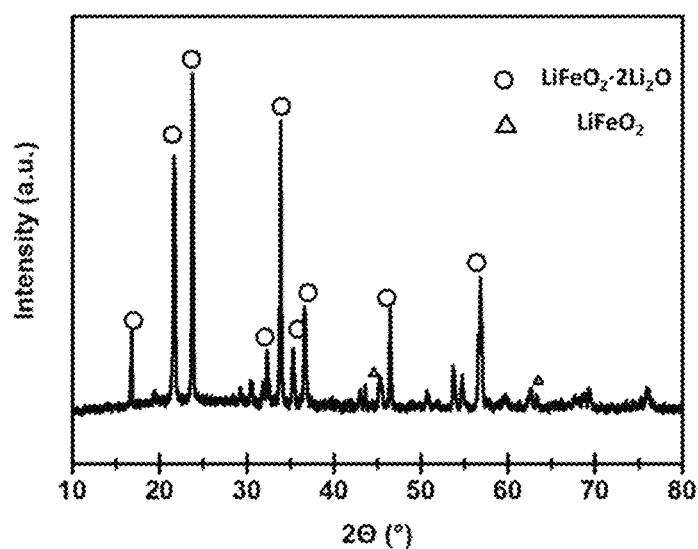
FIG. 7 is an X-ray diffraction pattern of the lithium-rich iron-based composite material in Example 15.

1.2 The lithium-rich iron-based composite materials obtained from Examples 11 and 15 were characterized by X-ray diffraction. Referring to FIGS. 6 and 7, FIG. 6 is the XRD pattern of the lithium-rich iron-based composite material provided in Example 11 of the present application, and FIG. 7 is the XRD pattern of the lithium-rich iron-based composite material provided in Example 15 of the present application. It can be seen from FIG. 6 that the lithium-rich iron-based composite material has diffraction peaks of $LiFeO_2$ in addition to the main peaks of $Li_5FeO_4$; and it can be seen from FIG. 7 that the lithium-rich iron-based composite material is mainly $Li_5FeO_4$, with little amount of $LiFeO_2$.

1.3 The contents of doping element M in the lithium-rich iron-based composite materials of Examples 11 to 20 and the lithium-rich iron-based materials of Comparative Examples 11 to 12 were analyzed by inductively coupled plasma (ICP) emission spectrometry. The test results are shown in Table 1. The y value of the doping element M in Table 1 is the content of the doping element M in the lithium-rich iron-based composite materials.

2. Electrochemical Performance of Lithium-Ion Batteries:

The electrochemical performance of lithium secondary batteries containing lithium-rich iron-based composite materials from Examples 11 to 25 and lithium-rich iron-based materials from Comparative Examples 11 and 12 were tested. The testing conditions are as follows: the assembled battery was placed at room temperature for 24 hours and then a charge and discharge test were conducted, and the charge and discharge voltage was 2.7 V-4.3 V. Referring to Table 1 for the electrochemical properties of the lithium secondary batteries containing the lithium-rich iron-based composite materials from Examples 11 to 20 and the lithium-rich iron-based materials from Comparative Examples 11 and 12.

TABLE 1

| | Performance Parameters | | | | |
|---|---|---|---|---|---|
| Example | Y value of doping element M | Status of cathode slurry | Carbon coating amount (wt %) | Specific capacity in first charging (mAh/g) | Initial efficiency (%) |
| Example 11 | 0 | Normal | 2.5 | 180.2 | 82.8 |
| Example 12 | 0.01 | Normal | 2.8 | 181.3 | 82.3 |
| Example 13 | 0.015 | Normal | 3.0 | 182.2 | 81.9 |
| Example 14 | 0.015 | Normal | 2.2 | 179.4 | 83.2 |
| Example 15 | 0.01 | Normal | 3.5 | 184.6 | 80.9 |
| Example 16 | 0.01 | Normal | 3.7 | 185.3 | 80.6 |
| Example 17 | 0.01 | Normal | 2.6 | 183.0 | 81.6 |
| Example 18 | 0.01 | Normal | 2.4 | 182.1 | 81.9 |
| Example 19 | 0.01 | Normal | 16 | 174.3 | 85.7 |
| Example 20 | 0.01 | Normal | 10.8 | 175.3 | 85.2 |
| Comparative Example 11 | 0 | Jelly | 0 | 170.3 | 87.7 |
| Comparative Example 12 | 0 | Normal | 0 | 167.1 | 95.9 |

As can be observed from Table 1, the cathode slurry prepared from the lithium-rich iron-based composite materials provided in Examples 11 to 20 of the present application does not show a jelly-like phenomenon and are easy to coat. When these slurries were added to lithium secondary batteries, the cathodes have a higher initial specific capacity and a lower initial efficiency, thereby compensating for the decrease in energy density caused by the irreversible lithium loss on the anodes due to the first charging.

From the experiment of the comparative example, it is known that the lithium-rich iron-based material in the Comparative Example 11 was not coated, and water absorption has led to the formation of jelly during the preparation of the cathode slurry, which adversely affects coating of the cathode slurry.

From Examples 12 and 19, Examples 15 and 20, it can be found that when the contents of the carbon coating layers of the lithium-rich iron-based composite materials in Examples 19 and 20 increase, the electrochemical activity of the lithium-ion batteries is reduced, and the capacity performance is also reduced. Therefore, in the embodiments of the present application, the thickness of the carbon coating layer of the lithium-rich iron-based composite material should not be too thick or the content should not be too high, which will reduce the lithium supplementation effect of the lithium-rich iron-based composite materials.

3. XRD Analysis and Capacity Test of Lithium-Rich Iron-Based Composite Materials XRD analysis was carried out on the lithium-rich iron-based composite materials in the above-mentioned Examples 11 to 25, and Comparative Examples 11, 13 and 14, respectively, and analysis for the charging capacity as shown in Table 2 below was carried out on the lithium-ion batteries containing the lithium-rich iron-based composite materials in Examples 11 to 25, and Comparative Examples 11, 13 and 14. In the XRD spectrum of the lithium-rich iron-based composite materials in the Examples 11, 13, 16, and 21, and Comparative Examples 11, 13 and 14 using CuKα rays, the intensities of the peaks at $2\Theta=16.7\pm0.5°$, $33.7\pm0.5°$, and $43.5\pm0.5°$ were $I_a$, $I_b$, and $I_c$, respectively. The relation therebetween, together with the charging capacities of the corresponding lithium-ion batteries are shown in Table 2 below.

TABLE 2

Different peak intensities and capacity of the lithium-rich iron-based composite materials

| | Performance Parameter | | |
|---|---|---|---|
| Example | $I_a/I_b$ | $I_a/I_c$ | Charging capacity mAh/g |
| Example 11 | 0.273 | 1.563 | 505 |
| Example 13 | 0.345 | 0.548 | 489 |
| Example 16 | 0.331 | 0.931 | 532 |
| Example 21 | 0.296 | 0.764 | 550 |
| Comparative Example 11 | 0.236 | 0.246 | 296 |
| Comparative Example 13 | 0.245 | 0.296 | 385 |
| Comparative Example 14 | 0.256 | 0.38 | 432 |

It can be found in Table 2, after the carbon coating of the lithium-rich iron-based composite materials in the Examples 11, 13, 16, and 21, $I_a/I_b$ is above 0.26, and $I_a/I_c$ is above 0.5, which indicates $Li_5FeO_4$ accounts for a larger proportion amongst the free lithium ions, and therefore, the lithium-ion batteries produced have higher specific capacity in the first-time charging. By applying the lithium-rich iron-based composite materials in existing cathode material systems such as LFP/NCM/LCO/LMO, the reduction in energy density caused by the irreversible lithium consumption at anodes can be compensated.

From the Comparative Examples 13 and 14, it can be found that since, in the lithium-rich iron-based composite materials $aLiFeO_2 \cdot bLi_2O \cdot cM_xO_y$, b/a<1.8, the lithium source that can contribute to the capacity is limited, and the peak intensities of $LiFeO_2$ are relatively high with a low $I_a/I_c$ ratio, thus the charging capacities are lower.

4. Raman Analysis, Resistivity and Capacity Test of the Lithium-Rich Iron-Based Composite Materials XRD analysis was carried out on the lithium-rich iron-based composite materials in the above-mentioned Examples 11 to 25, and Comparative Examples 11 and 15, respectively, and analysis for the charging capacity as shown in Table 3 below was carried out on the lithium-ion batteries containing the lithium-rich iron-based composite materials in Examples 11 to 25, and Comparative Examples 11 and 15. The Raman analysis and resistivity of the lithium-rich iron-based composite materials in Examples 22 to 25 and Comparative Examples 11 and 15, and capacity of the corresponding lithium-ion batteries are as shown in Table 3.

TABLE 3

Ratios of Raman peak intensities D/G and corresponding capacities of the lithium-rich iron-based composite materials

| | Performance Parameter | | |
|---|---|---|---|
| Example | $I_D/I_G$ | Resistivity of powder $\Omega \cdot cm$ | Charging capacity mAh/g |
| Example 22 | 2.1 | 1.9 | 540 |
| Example 23 | 2.5 | 5.2 | 525 |
| Example 24 | 2.9 | 249.3 | 493 |
| Example 25 | 3.7 | 699.3 | 480 |
| Comparative Example 11 | 4.5 | 1500 | 430 |
| Comparative Example 15 | 4.2 | 3100 | 412 |

It can be found in Table 3, after the carbon coating of the lithium-rich iron-based composite materials in Examples 22 to 25 by carbon heat treatment, $I_D/I_G$ is below 4.0, and the resistivity of powder is less than 1000 $\Omega \cdot cm$, which indicates that the carbon coating obtained by carbon heat treatment has good conductivity, and the lithium-ion battery prepared has higher specific capacity in the first-time charging. By applying the lithium-rich iron-based composite materials in existing cathode material systems such as LFP/NCM/LCO/LMO, the reduction in energy density caused by the irreversible lithium consumption at anodes can be compensated.

From the results of Comparative Examples 11 and 15, it can be found that after the in-situ carbothermal reduction coating on the lithium-rich iron-based composite materials, the carbon layer has a high degree of disorder, and $I_D/I_G$ is relatively high which leads to reduction in conductivity and a low coking value. The porosity after carbonization is high, and when b/a≤1.8 in the molecular formula of the lithium-rich iron-based material, storage of the lithium-rich iron-based composite materials becomes difficult, and it is easy to absorb water in an ambient environment, resulting in performance degradation.

The above are merely optional embodiments of the present application, and are not intended to limit the present application. Any modification, equivalent replacement, and improvement made within the spirit and principle of the present application shall fall within the scope of protection of the present application.

What is claimed is:

1. A lithium-rich iron-based composite material, comprising a lithium-rich iron-based material having a molecular formula of $aLiFeO_2 \cdot bLi_2O \cdot cM_xO_y$, wherein a, b, and c are numbers of moles, and 0<c/(a+b+c)≤0.02, 1.8≤b/a<2.1, M is a doping element, and 1≤y/x≤2.5; and wherein the lithium-rich iron-based composite material is in a form of particles, with a particle size of 1 µm≤D50≤15 µm, D10/D50≥0.3, D90/D50≤2; and in a Raman spectrum of the lithium-rich iron-based composite material, intensities of scattering peaks at wavelengths of 1330 cm$^{-1}$ and 1580 cm$^{-1}$ are respectively recorded as $I_D$ and $I_G$, where $I_D/I_G$<4.0.

2. The lithium-rich iron-based composite material according to claim 1, wherein the doping element comprises at least one of Ni, Co, Mn, Ti, Al, Cu, V, and Zr; and the lithium-rich iron-based material is in the form of particles with a particle size of 1 µm≤D50≤10 µm, D10/D50≥0.3, D90/D50≤2; and the lithium-rich iron-based material is in the form of particles, having a surface coated with a carbon coating layer.

3. The lithium-rich iron-based composite material according to claim 2, wherein a thickness of the carbon coating layer is 1-200 nm; and/or the carbon coating accounts for 1 wt %-5 wt % of a total mass of the lithium-rich iron-based composite material.

4. The lithium-rich iron-based composite material according to claim 1, wherein a specific surface area of the lithium-rich iron-based composite material is 0.5≤BET≤20 m$^2$/g; and a resistivity of the lithium-rich iron-based composite material is 1.0-1000 Ω/cm.

5. The lithium-rich iron-based composite material according to claim 1, wherein in an X-ray diffraction spectrum of the lithium-rich iron-based composite materials, peaks in ranges of 2Θ=16.7±0.5° and 33.7±0.5° originate from crystal planes (111) and (222) of LiFeO$_2$·2Li$_2$O, and intensities of the peaks within the ranges of 2Θ=16.7±0.5° and 33.7±0.5° are respectively recorded as $I_a$ and $I_b$; where $I_a/I_b$≥0.26.

6. The lithium-rich iron-based composite material according to claim 5, wherein a peak in a range of 2Θ=43.5±0.5° corresponds to a crystal plane (220) of LiFeO$_2$, and an intensity of the peak is recorded as $I_c$, where $I_a/I_c$≥0.5.

7. The lithium-rich iron-based composite material according to claim 1, wherein $I_D/I_G$<3.0.

8. A preparation method of the lithium-rich iron-based composite material of claim 1, comprising:

mixing, according to a stoichiometric ratio of elements in a molecular formula of aLiFeO$_2$·bLi$_2$O·cM$_x$O$_y$, an iron source, a lithium source, and a doping element source to form a precursor; and carrying out a first sintering treatment for the precursor to generate the lithium-rich iron-based material with the molecular formula of aLiFeO$_2$·bLi$_2$O·cM$_x$O$_y$.

9. The preparation method according to claim 8, wherein the iron source comprises at least one of iron oxide, iron nitrate, iron chloride, iron hydroxide, iron oxalate, iron acetate, and iron hydroxide; and/or the lithium source comprises at least one of lithium hydroxide, lithium carbonate, lithium nitrate, lithium acetate, lithium oxide, and lithium oxalate; and/or the doping element source comprises at least one of Cu, Co, Al, Ti, Fe, V, and Zr sources; and/or a first sintering temperature is at 600-1000° C., and a duration thereof is 4-48 h; and/or the first sintering treatment is performed at a heating rate of 10-500° C./h until the first sintering temperature; and/or the first sintering treatment is followed by a second sintering treatment, which comprises:

crushing a product obtained from the first sintering treatment and heating at 0-500° C./h to 600-1000° C. for a heat treatment of 1-20 h.

10. The preparation method according to claim 9, wherein the Cu source comprises at least one of copper oxide, copper nitrate, copper chloride, copper hydroxide, copper acetate, and copper carbonate;

the Co source comprises at least one of cobalt oxide, cobalt nitrate, cobalt chloride, cobalt hydroxide, cobalt acetate, and cobalt carbonate;

the Al source comprises at least one of aluminum oxide, aluminum nitrate, aluminum chloride, aluminum acetate, and aluminum hydroxide;

the Ti source comprises at least one of titanium dioxide and titanium chloride;

the Ni source comprises at least one of nickel oxide, nickel nitrate, nickel chloride, nickel acetate, and nickel hydroxide;

the V source comprises at least one of vanadium pentoxide and vanadyl nitrate;

the Zr source comprises at least one of zirconium oxide, zirconium nitrate, zirconium chloride, zirconium acetate, zirconium hydroxide, and zirconium carbonate.

11. The preparation method according to claim 9, further comprising, after the first sintering treatment or the second sintering treatment, a step of forming a carbon coating layer on the surface of the lithium-rich iron-based material.

12. The preparation method according to claim 8, wherein in the step of mixing the iron source, the lithium source, and the doping element source, a carbon source is also added, and the carbon source and the total mass of the reactant is 5 wt %-50 wt %.

13. A lithium-supplementing additive for cathodes, comprising the lithium-rich iron-based composite material according to claim 1.

14. A cathode material, comprising the lithium-rich iron-based composite material according to claim 1.

15. A cathode, comprising:

a current collector; and a cathode active layer bonded to a surface of the current collector, wherein the cathode active layer comprises a cathode active material, a lithium-supplementing additive, a binder and a conductive agent;

wherein the lithium-supplementing additive is the lithium-rich iron-based composite material according to claim 1.

16. The cathode according to claim 15, wherein a content of the lithium-supplementing additive in the cathode active layer is 0.5 wt %-10 wt %; and/or a content of the conductive agent in the cathode active layer is 0.2 wt %-5 wt %; and/or a content of the binder in the cathode active layer is 0.5 wt %-3 wt %.

17. A lithium-ion battery, comprising a cathode, wherein the cathode is the cathode according to claim 15.

18. The lithium-ion battery according to claim 17, wherein the lithium-ion battery is a lithium-ion half cell, having an initial coulombic efficiency of 75%-99%.

19. The lithium-rich iron-based composite material according to claim 1, wherein the doping element comprises at least one of Ni, Co, Ti, Cu, V, and Zr.

* * * * *